(12) United States Patent
Kinskey et al.

(10) Patent No.: US 8,708,351 B2
(45) Date of Patent: Apr. 29, 2014

(54) ROLLING TOOL BAG

(75) Inventors: Terrence P. Kinskey, Alpharetta, GA (US); Matthew G. Williams, Lighthouse Point, FL (US)

(73) Assignee: LF Centennial Ltd., Road Town, Tortola (VG)

( * ) Notice: Subject to any disclaimer, the term of this patent is extended or adjusted under 35 U.S.C. 154(b) by 0 days.

(21) Appl. No.: 13/350,391

(22) Filed: Jan. 13, 2012

(65) Prior Publication Data

US 2012/0228841 A1    Sep. 13, 2012

Related U.S. Application Data

(60) Provisional application No. 61/432,865, filed on Jan. 14, 2011.

(51) Int. Cl.
*B62B 1/00* (2006.01)
*B62B 5/00* (2006.01)

(52) U.S. Cl.
USPC ............... 280/47.26; 280/47.131; 280/47.17; 190/124; 190/127

(58) Field of Classification Search
USPC ............ 280/47.131, 47.17, 47.19, 47.6; 190/122, 124–127; 206/372, 373, 349
See application file for complete search history.

(56) References Cited

U.S. PATENT DOCUMENTS

| | | | |
|---|---|---|---|
| 1,468,816 A * | 9/1923 | Johnson | 150/130 |
| 2,531,302 A * | 11/1950 | Schwennicke | 190/115 |
| 2,716,473 A * | 8/1955 | Droutman | 190/119 |
| 4,374,555 A * | 2/1983 | March | 190/114 |
| 4,529,069 A * | 7/1985 | March | 190/114 |
| 4,744,445 A * | 5/1988 | Anderson et al. | 190/107 |
| 4,951,818 A * | 8/1990 | Johnson | 206/315.1 |
| 5,524,737 A * | 6/1996 | Wang | 190/18 A |
| 6,050,576 A * | 4/2000 | Tanner et al. | 280/47.21 |
| 6,109,404 A * | 8/2000 | Bishop | 190/125 |
| 6,220,412 B1 * | 4/2001 | Lin | 190/127 |
| 6,612,413 B2 * | 9/2003 | Kuwayama | 190/127 |
| 7,004,481 B1 * | 2/2006 | Stanish | 280/37 |
| 7,090,399 B2 * | 8/2006 | Godshaw et al. | 383/119 |
| D553,362 S | 10/2007 | Godshaw et al. | |
| 7,311,200 B2 | 12/2007 | Godshaw et al. | |
| 7,331,454 B2 | 2/2008 | Godshaw et al. | |

(Continued)

FOREIGN PATENT DOCUMENTS

WO    WO 9305943 A1 *    4/1993    .............. B29C 43/04

*Primary Examiner* — J. Allen Shriver, II
*Assistant Examiner* — Steve Clemmons
(74) *Attorney, Agent, or Firm* — Duane Morris LLP; J. Rodman Steele, Jr.; Gregory M. Lefkowitz

(57) ABSTRACT

A rolling tool bag is described. The tool bag can include a tool bag body comprising an open topped storage volume. The tool bag body including interior facings, exterior facings enclosing first and second body reinforcing members that reinforce a bottom wall, a back wall, a right side wall, a front wall, and a left side wall of the tool bag body. The interior and exterior facings are coupled to form first and second compartments with the first and second body reinforcing members disposed therein. The tool bag also includes an axle-handle stabilizing member attached to the tool bag body; an axle coupled to the axle-handle stabilizing member; and a handle rigidly coupled to said axle-handle stabilizing member. First and second wheels are attached to opposite ends of the axle. The wheels are located outside the right side wall and the left side wall, respectively.

17 Claims, 15 Drawing Sheets

(56) References Cited

U.S. PATENT DOCUMENTS

| | | |
|---|---|---|
| 2003/0042093 A1* | 3/2003 | Godshaw et al. ............ 190/115 |
| 2006/0261568 A1* | 11/2006 | Udall et al. ............... 280/79.11 |
| 2006/0289261 A1* | 12/2006 | Tsai ............................ 190/127 |
| 2007/0102253 A1* | 5/2007 | Godshaw et al. .......... 190/18 A |
| 2008/0035509 A1* | 2/2008 | Redzisz ....................... 206/373 |
| 2008/0179370 A1* | 7/2008 | Williams ..................... 224/682 |
| 2009/0008281 A1* | 1/2009 | Williams et al. ............. 206/373 |
| 2009/0038901 A1* | 2/2009 | Pomerantz ................... 190/121 |
| 2009/0243241 A1* | 10/2009 | Arakawa et al. .......... 280/47.19 |

\* cited by examiner

ROLLING TOOL BAG

CROSS-REFERENCE TO RELATED APPLICATIONS

This application claims the benefit of U.S. Provisional Application No. 61/432,865, filed Jan. 14, 2011.

FIELD OF THE INVENTION

The present invention relates generally to the field of bags, and more particularly to a multi-function tool bag that is useful for storing tools.

BACKGROUND

Rolling tool carriers are known to be useful for workers needing to transport a group of tools to and from a work site for a specific job. Although tool carriers have historically been made of metal, more recently, fabric covered tool carriers have become popular. Exemplary prior art rolling tool carriers include those disclosed in U.S. Pat. Nos. 7,311,200; 7,331,454; and D553,362. While these rolling tool carriers and others of the prior art are useful in some instances, there are still numerous deficiencies and the potential for more useful rolling tool carriers and tool carrier features.

SUMMARY OF THE INVENTION

A tool bag that includes a tool bag body; an axle-handle stabilizing member attached to the tool bag body; an axle and a handle coupled to the axle-handle stabilizing member; and first and second wheels attached to opposite ends of the axle is disclosed. The tool bag body can include first and second body reinforcing members that reinforce a bottom wall, a back wall, a right side wall, a front wall, and a left side wall of the tool bag body. The tool bag body also includes interior facings covering the interior of the tool bag body and exterior facings covering the exterior of the tool bag body. The interior and exterior facings are coupled to form first and second compartments and the first and second body reinforcing members are disposed within the first and second compartments, respectively. The first and second wheels are located outside the right side wall and the left side wall, respectively. A support leg can extend from an exterior, front portion of the bottom wall.

The interior and exterior facings can be coupled via a binding. The binding extends along the path defined by the adjacent edges of the first and second body reinforcing members. The first body reinforcing member can reinforce both a bottom wall and back wall of the tool bag body, and the second body reinforcing member can reinforce a right side wall, a front wall and a left side wall of the tool bag body. In some examples, the first body reinforcing member is not attached to the second body reinforcing member.

The tool bag can also include a back wall stabilizing plate disposed internal to the body reinforcing members. The axle-handle stabilizing member can be disposed outside the tool bag body and be attached to the back wall stabilizing plate.

The handle can include a handle mounting portion. The handle mounting portion can be attached to the back wall stabilizing plate and the axle-handle stabilizing member.

The tool bag can include a bottom wall stabilizing plate disposed internal to the body reinforcing members. The axle-handle stabilizing member can be attached to the bottom wall stabilizing plate.

The bottom wall stabilizing frame can be disposed internal to the body reinforcing members. The bottom wall stabilizing frame can be coupled to the bottom wall stabilizing plate, a back wall portion of the first body reinforcing member, and a bottom wall portion of the first body reinforcing member. The bottom wall stabilizing plate can be disposed between the first body reinforcing member and the bottom wall stabilizing frame.

The bottom wall stabilizing frame can include at least one longitudinally-oriented element and at least one laterally-oriented element coupled together. The laterally-oriented element extending substantially across a width of the bottom wall.

The tool bag can include a lid member, pivotably coupled to the back wall. The lid member can be designed for closeable attachment to an upper rim of the tool bag body. The lid member can include a lid stabilizing plate. The tool bag can include a reinforcing rim element disposed proximate the upper rim of the tool bag body for maintaining a shape of the upper rim.

The tool bag can include at least one side-stabilizing member coupled to each of a right side wall portion, a front wall portion and a left side wall portion of the first and/or second body reinforcing member. The at least one side-stabilizing member can be arranged vertically and can have an aspect ratio of 2:1 or greater.

The tool bag body can include at least one corner-stabilizing member extending from a left side wall to a front wall of the second body reinforcing member, from a front wall to a right side wall of the second body reinforcing member, or both.

These and other features, objects and advantages of the present invention will become more apparent to one skilled in the art from the following description and claims when read in light of the accompanying drawings.

DETAILED DESCRIPTION

Figure 1:
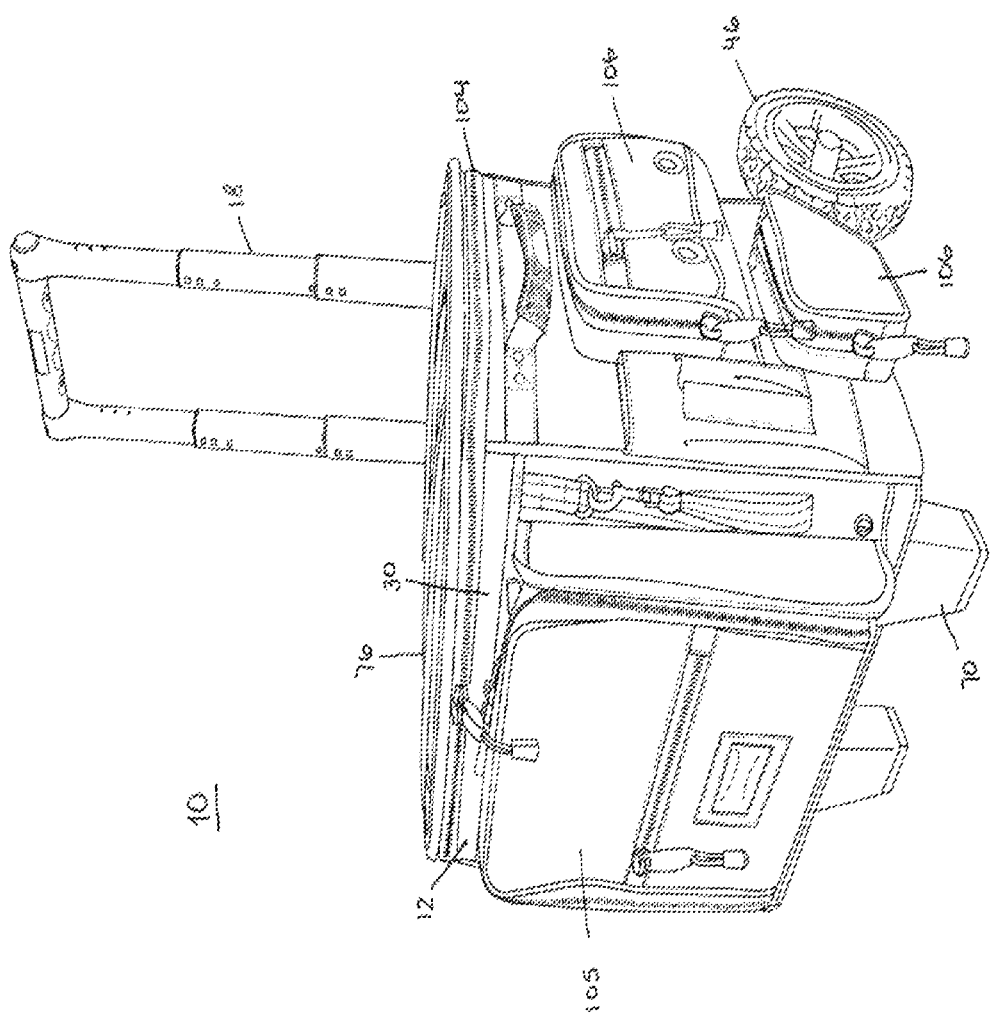
FIG. 1 is a perspective view of a rolling tool bag described herein.

As shown in FIGS. 1-15, a rolling tool bag 10 with a tool bag body 12 attached to an axle-handle stabilizing member 14 is described. The axle-handle stabilizing member 14 is attached to an axle 16 and a handle 18 to produce a robust, rolling tool bag 10. The tool bag body 12 is configured to hold a variety of tools for easy storage, transport and access when working on a project. In particular, the tool bag 10 exhibits exceptional durability even when equipment weighing 100 pounds or more is stored in the tool bag body 12.

Figure 15:
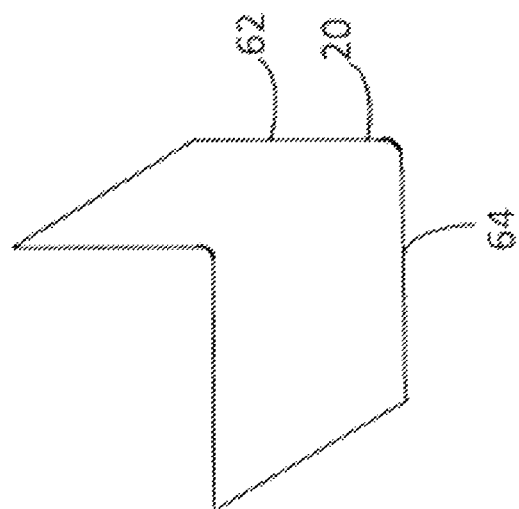
FIG. 15 is an exploded view showing the general relationship between the first and second body reinforcing members.
Figure 15:
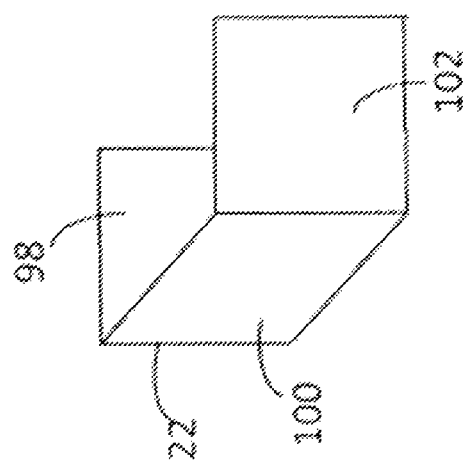

The tool bag 10 can include a tool bag body 12 comprising an open topped storage volume formed by first and second body reinforcing members 20, 22. The first and second reinforcing members 20, 22 can reinforce the bottom wall 24, the back wall 26, the right side wall 28, the front wall 30, and the left side wall 32 of the tool bag body 12. An exemplary arrangement of the first and second reinforcing members 20, 22 is shown in FIG. 15.

The tool bag body 12 also includes interior facings 34 covering the interior 36 of the tool bag body 12 and exterior facings 38 covering an exterior 40 of the tool bag body 12. The interior and exterior facings 34, 38 can be coupled to form first and second compartments 42, 44. The first and second body reinforcing members 20, 22 can be disposed within the first and second compartments 42, 44, respectively. The interior and exterior facings 34, 38 can be formed from fabric, plastic reinforced fabric or other appropriate materials. Exemplary plastic reinforced fabric materials include those sold under the SPUNTUFF trademark.

The tool bag 10 also includes an axle-handle stabilizing member 14 attached to the tool bag body 12. The axle-handle stabilizing member can be coupled to the axle 16 and the handle 18. First and second wheels 46, 48 can be attached to opposite ends of the axle 16. The first and second wheels 46, 48 can be located outside the right and left side walls 28, 32, respectively. As shown in FIGS. 1, 5, 13 and 14, the handle 18 can be a telescoping handle.

Figure 4:
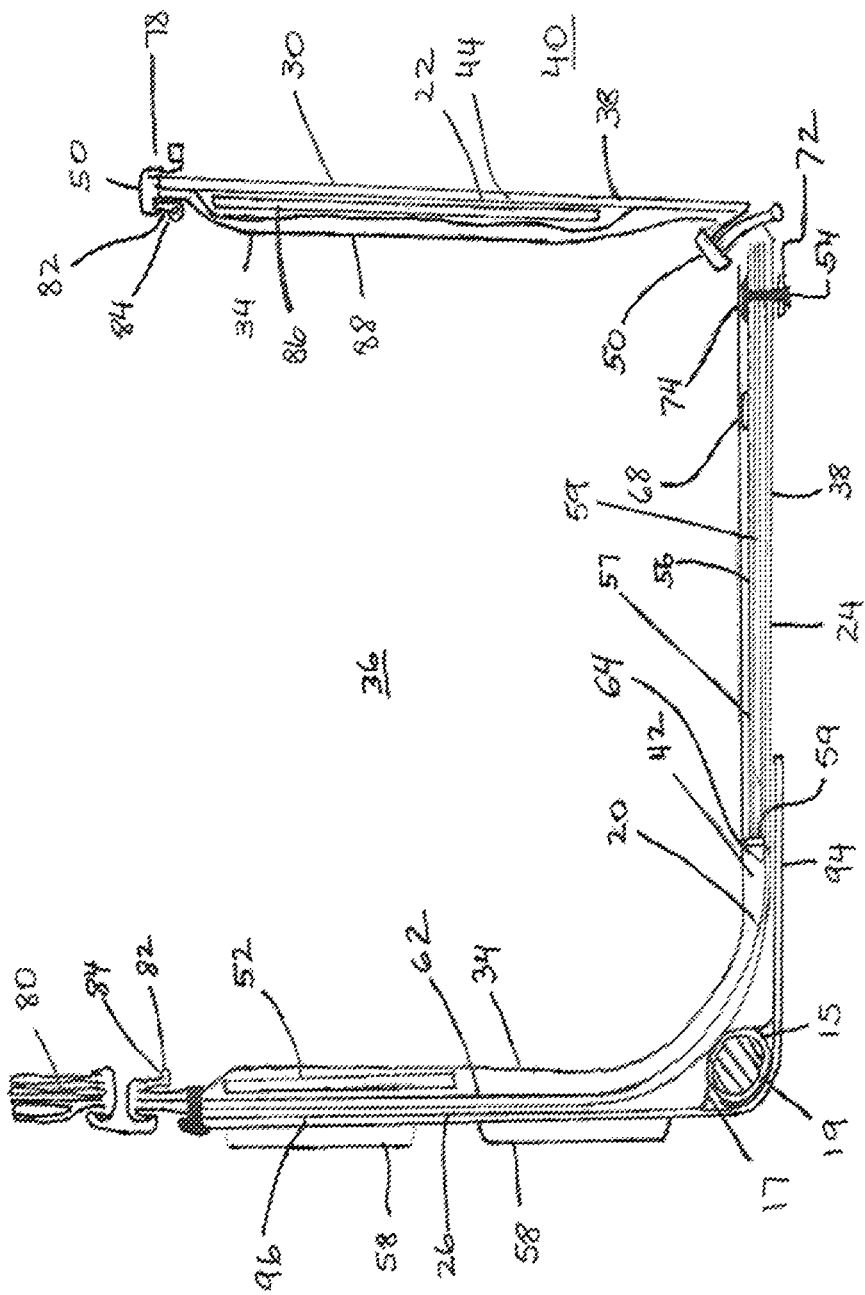
FIG. 4 is a cross-sectional view of rolling tool bag described herein, taken along cut line 4-4 in FIG. 3.

The axle 16 can be any type of axle known in the art and can be attached in a variety ways. For example, as shown in FIG. 4, the axle 16 can include a hollow tube 15 welded to the axle-handle stabilizing member and reinforced with a metal strip 17 over the hollow tube 15. A shaft 19 to which the wheels 46, 48 are attached can be disposed within the hollow tube 15.

The interior and exterior facings 34, 38 can be coupled via a binding 50. The binding 50 can be located inside 36 the tool bag body 12, as shown in FIG. 4, or outside the tool bag body 12.

The binding 50 can extend along a path defined by the adjacent edges of the first and second body reinforcing members 20, 22. For example, FIG. 4 shows a binding 50 that is formed between the first and second body reinforcing members 20, 22 between the front wall 30 and the bottom wall 24. Such a binding path would be present where the first and second reinforcing members 20, 22 are arranged as shown in FIG. 15.

As shown in FIG. 15, the first body reinforcing member 20 can reinforce both the bottom wall 24 and the back wall 26 of the tool bag body 14. The second body reinforcing member 22 can reinforce the right side wall 28, the front wall 30, and the left side wall 32 of the tool bag body 12 as shown in FIG. 15. In such an embodiment, a continuous binding 50 formed between adjacent edges of the first and second body reinforcing members 20, 22 will have a bent-U-shape and will extend along a right edge of the back wall 26, a right edge of the bottom wall 24, a front edge of the bottom wall 24, a left edge of the bottom wall 24, and a left edge of the back wall 26.

As used herein, "stabilizing members" are more robust structurally than "reinforcing members." Exemplary materials for reinforcing members include paper and plastic, including but not limited to, polyethylene (PE), polypropylene (PP), polystyrene (PS), polyesters, combinations thereof, and any other material that is not rigid under moderate loads, e.g., 10 pounds. Exemplary materials for stabilizing members include metals, e.g., steel, particle board, wooden planks or sheets, or any other material that maintains its shape under moderate loads, e.g., 10 pounds. Exemplary stabilizing members include steel plates that are 1/32" or more in thickness, or 1/16" or more in thickness. The thickness of the stabilizing material can be such that the stabilizing material maintains its shape when the material is cantilevered off a base and a moderate load is applied for 30 seconds.

In some instances, a stabilizing member can be coupled to one or more reinforcing members. For example, as shown in FIGS. 4 and 12, the bottom wall stabilizing plate 56 can include a stabilizing member, such as particle board 55, sandwiched between two reinforcing members, such as PE sheets 57, that are all stitched together by thread 59.

In some tool bags 10 described herein, the first body reinforcing member 20 is not attached to the second body reinforcing member 22. In such tool bags 10, the integrity of the tool bag body 12 can be largely the result of the particular configuration of the body reinforcing members 20, 22 and the unique coupling of the interior and exterior facings 34, 38 described herein. For example, the arrangement of the bindings 50 described and shown herein.

Figure 2:
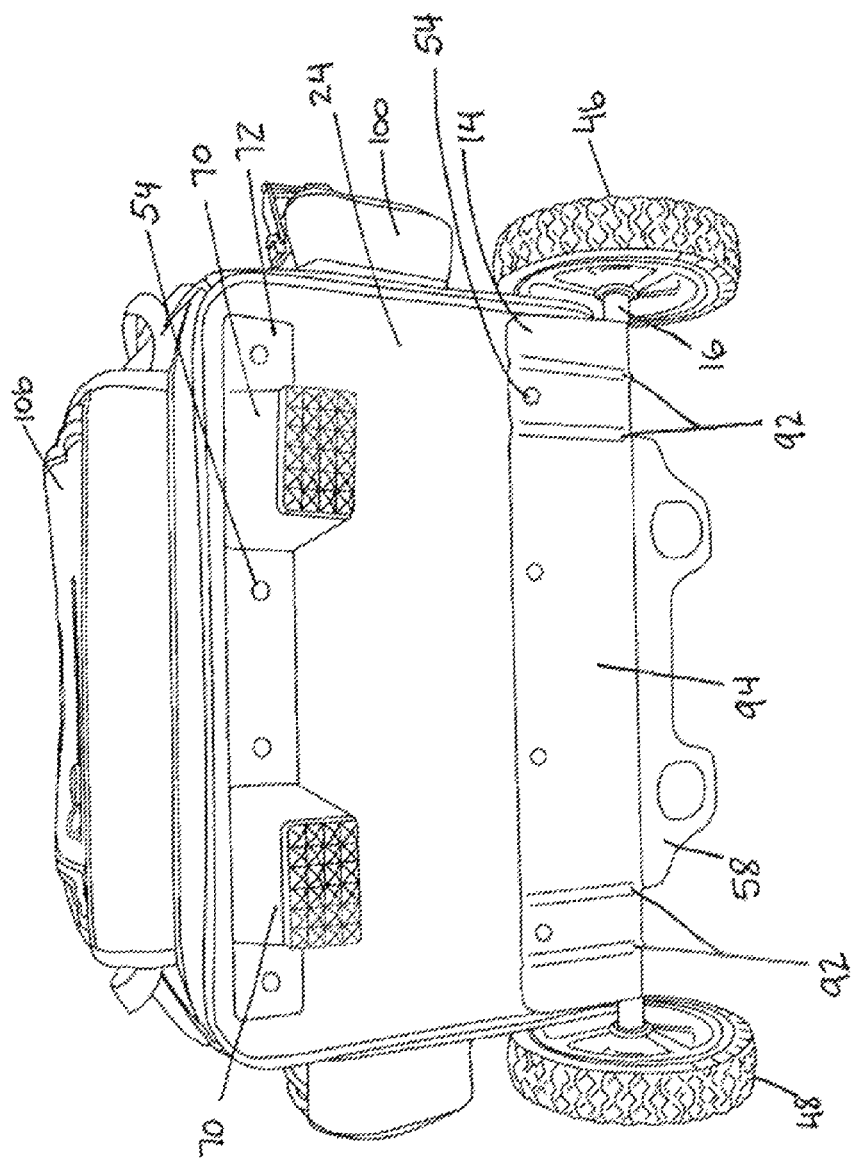
FIG. 2 is a perspective, bottom view of a rolling tool bag described herein.
Figure 7:
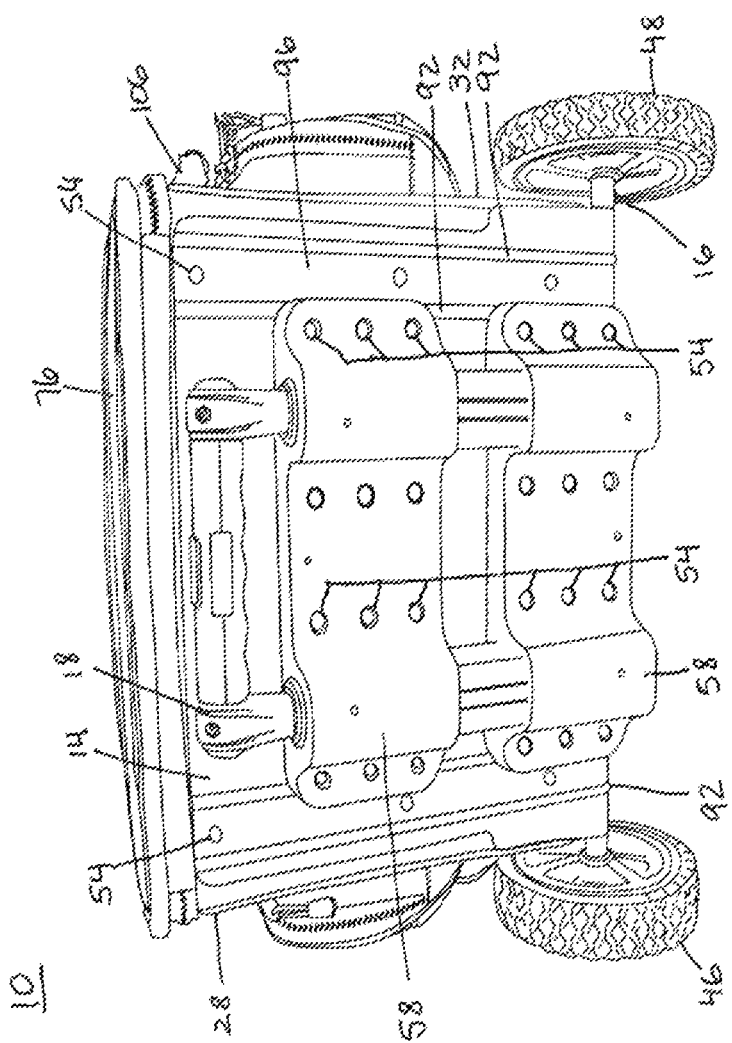
FIG. 7 is a back view of a rolling tool bag described herein.
Figure 12:
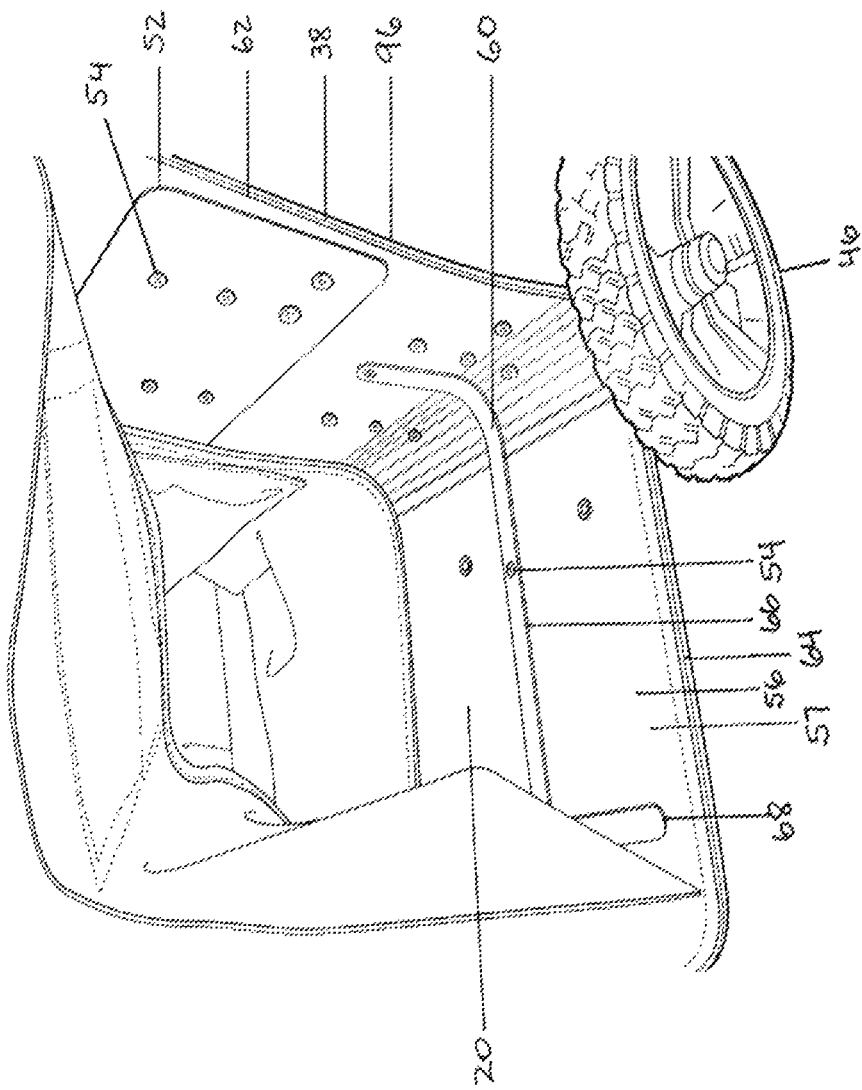
FIG. 12 is a peel-away view of the rolling toll bag described herein where the right wall and the interior facings have been removed in order to reveal structural components of the tool bag body.

As shown in FIGS. 4 and 12, the tool bag 10 can also include a back wall stabilizing plate 52 disposed internal to the body reinforcing members 20, 22. The axle-handle stabilizing member 14 can be disposed outside the tool bag body 12 and the axle-handle stabilizing member 14 can be attached to both the back wall stabilizing plate 52 and the back wall 26. For example, the axle-handle stabilizing member 14 can be attached to the back wall stabilizing plate 52 via a rivet 54 or other means of rigid attachment. The axle-handle stabilizing member 14 can include at least four parallel, longitudinally-oriented ridges 92 extending along a bottom wall stabilizing portion 94 and a back wall stabilizing portion 96 of the axle-handle stabilizing member 14. As shown in FIGS. 2 and 7, two of the parallel, longitudinally-oriented ridges can be located on each lateral side of the axle-handle stabilizing member 14.

As used herein, an element is "internal to" or located to the "interior" of the reinforcing members 20, 22 if the element is on the side of the reinforcing members 20, 22 most proximate the open storage volume 36 of the tool bag body 12. Thus, an element or member that is internal to the reinforcing members 20, 22 can be located between the reinforcing members 20, 22 and the interior facings 34.

The handle 18 can include one or more handle mountings 58 for attachment to the axle-handle stabilizing member 14. For exceptionally robust attachment of the handle 18, the handle mounting 58 can be attached to both a back wall stabilizing plate 52 and the axle-handle stabilizing member 14. In exemplary tool bags 10 described herein, any of the attachment methods described herein can be facilitated by one or more rivets 54. In an exemplary attachment mechanism, such as that shown in FIGS. 7, 12 and 13, the handle mounting 58 can be attached to both a back wall stabilizing plate 52 and the axle-handle stabilizing member 14 by twenty-four rivets 54.

The tool bag 10 can also include a bottom wall stabilizing plate 56 disposed internal to the body reinforcing members 20, 22. The axle-handle stabilizing member 14 can be attached to the bottom wall stabilizing plate 56. As evident from FIGS. 2, 4 and 6, in some tool bags 10 the axle-handle stabilizing member 14 will be L-shaped and will be attached to both the back wall stabilizing plate 52 and the bottom wall stabilizing plate 56.

As shown in FIGS. 4 and 12, the tool bag 10 can include a bottom wall stabilizing frame 60 disposed internal to the body reinforcing members 20, 22. As shown in FIG. 12, the bottom wall stabilizing frame 60 can be attached to the bottom wall stabilizing plate 56, a back wall portion 62 of the first body reinforcing member 20, and a bottom wall portion 64 of the first body reinforcing member 20. As shown in FIGS. 4 and 12, the bottom wall stabilizing plate 56 can be disposed between the first body reinforcing member 20 and the bottom wall stabilizing frame 60 (e.g., laterally-oriented element 68 in FIG. 4). The bottom wall stabilizing frame 60 can include at least one longitudinally-oriented element 66 and at least one laterally-oriented element 68 coupled together, e.g., by a rivet or screw. The laterally-oriented element 68 can extend substantially across the width of the bottom wall 24. As used herein, "substantially across" refers to at least 55% of a dimension, or at least 70% of a dimension, or at least 80% of a dimension.

As used herein, "vertical" is used to refer to the vertical direction when the tool bag 10 is in an upright position resting on the wheels and support leg(s) 70. As used herein, "longitudinal" is used to refer to the direction extending from the front wall to the back wall that is orthogonal to vertical. As used herein, "lateral" is used to refer to the direction extending from the left side wall toward the right side wall that is orthogonal to vertical. The terms vertical, longitudinal and lateral are intended to include minor deviations from the directions defined herein. For example, deviations of plus or minus 15 degrees, or plus or minus 10 degrees, or plus or minus 5 degrees.

As used herein, "left" refers to the side of the tool bag on an individual's left when looking at front of the tool bag, while "right" refers to the side of the tool bag on an individual's right when looking at the front of the tool bag.

Figure 3:
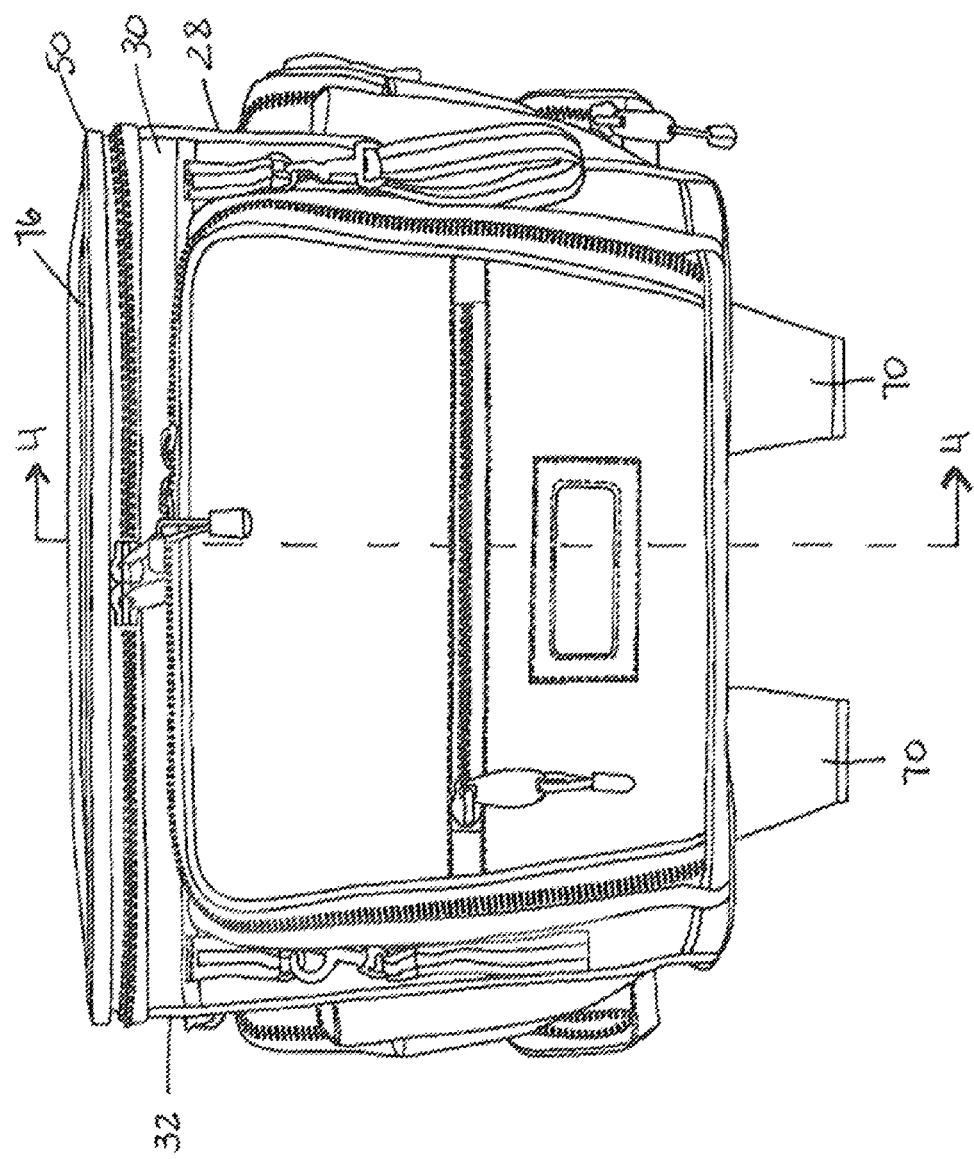
FIG. 3 is a front view of a rolling tool bag described herein.

As shown in FIG. 3, the tool bag 10 can also include one or more support legs 70 extending from an exterior, front portion of the bottom wall 24. As best seen in FIG. 2, the support leg 70 can include a mounting portion 72 attached to a support leg stabilizing member 74 disposed in the interior of the reinforcing members 20, 22. At least two support legs 70 can be coupled to the mounting portion 72. The support leg stabilizing member 74 can be separate from the bottom wall stabilizing plate 52 and can be located proximate the front wall 30.

As best shown in FIG. 4, a lid member 76 can be pivotably coupled to the back wall 26 of the tool bag body 12. The lid member 76 can be for closeable attachment to an upper rim 78 of the tool bag body 12. The lid member 76 can include a lid stabilizing plate 80.

A reinforcing rim element 82 can be disposed proximate an upper rim 78 of the tool bag body 12 for maintaining the shape of the upper rim 78. As shown, in FIG. 4, the reinforcing rim element 82 can be a stabilizing rod 84 surrounded by a retaining structure that can be coupled to the tool bag body 12. For example, as shown in FIG. 4, the stabilizing rod 84 can be embedded in plastic shaped such that there is a tab that can be stitched into a binding 50. Similarly, the stabilizing rod 84 can be wrapped in a facing that is stitched into a binding 50.

The stabilizing rod 84 can be a metal rod. The stabilizing rod 84 can, but does not necessarily, have a circular cross-section. The stabilizing rod 84 should be of sufficient thickness to help prevent deformation of the back wall 26, right side wall 28, front wall 30, and left side wall 32, and maintains its shape after a force is applied and removed. However, the stabilizing rod need 84 need not be so thick that it prevents all deformation. The stabilizing rod 84 can be on the order of $\frac{1}{16}^{th}$ of an inch or greater.

The tool bag 10 can also include side-stabilizing members 86. At least one side-stabilizing member 86 can be coupled to each of a right side wall portion 102, a front wall portion 100, and a left side wall portion 98 of the first and/or second body reinforcing member 20, 22. For example, as shown in FIG. 4, a retaining material 88 can be sewn to a body reinforcing member 20 or 22 and the side-stabilizing member 86 disposed within a space between the body reinforcing member 20, 22 and the retaining material 88. The side-stabilizing members 86 can be arranged vertically and have an aspect ratio of 2:1 or greater, an aspect ratio of 3:1 or greater, or an aspect ratio of 4:1 or greater.

Figure 10:
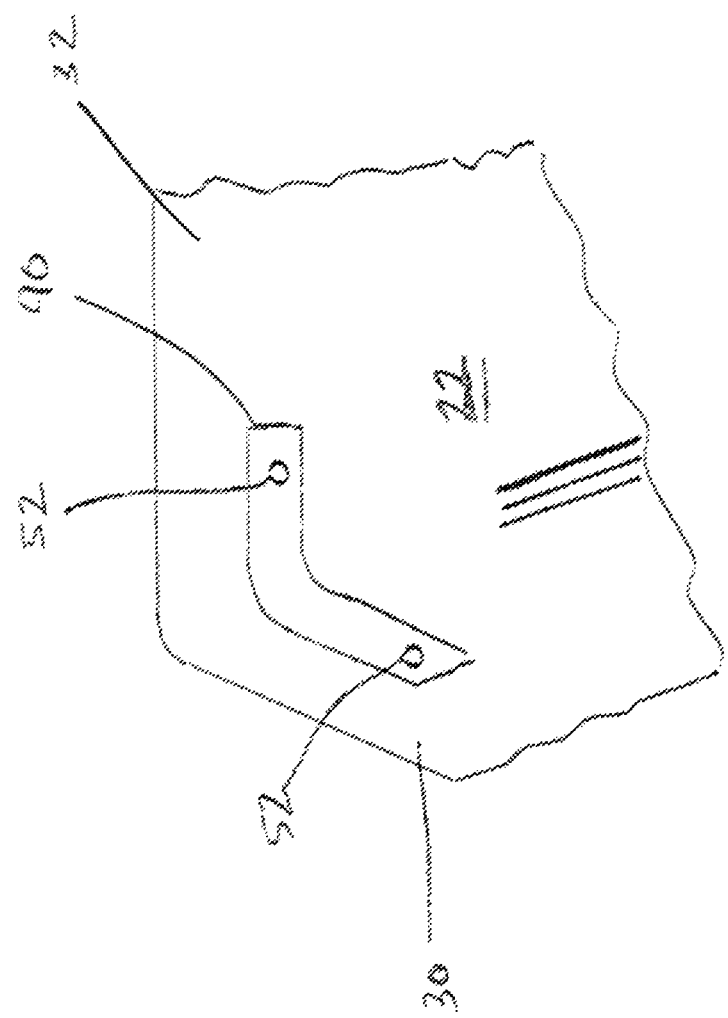
FIG. 10 is a perspective view showing the attachment of the corner-stabilizing member to the second body reinforcing member with the interior facings removed.

The tool bag body 12 can also include at least one corner-stabilizing member 90 extending from a left side wall 32 to a front wall 30 of the second body reinforcing member 22, from a front wall 30 to a right side wall 28 of said second body reinforcing member 22, or both. FIG. 10 shows a corner-stabilizing member 90 extending from a left side wall 32 to a front wall 30 of the second body reinforcing member 22 where the interior facings 38 have been removed. The corner-stabilizing members 90 can be arranged horizontally and have an aspect ratio of 3:1 or greater, an aspect ratio of 4:1 or greater, or an aspect ratio of 6:1 or greater.

Figure 8:
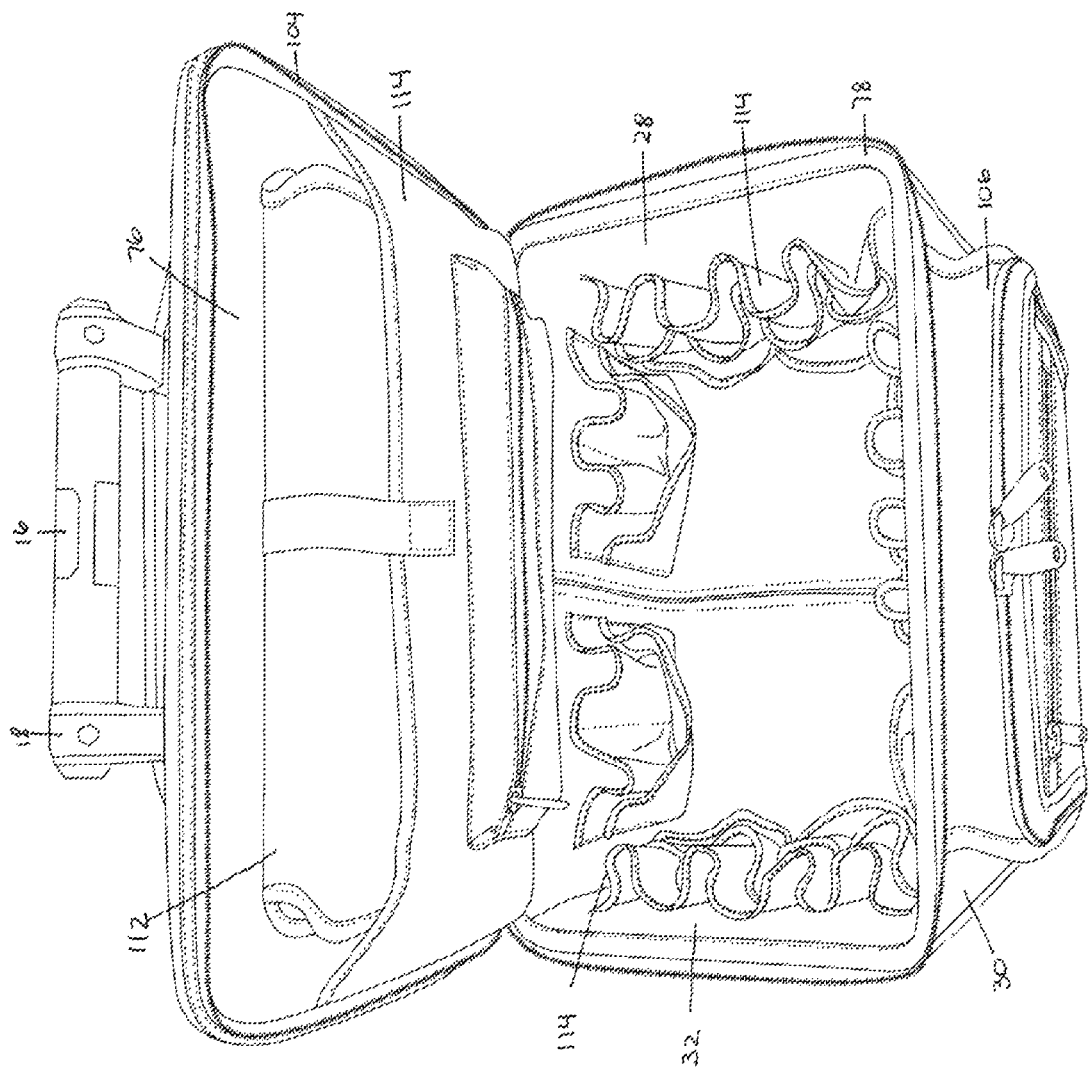
FIG. 8 is a top, perspective view of a rolling tool bag described herein with the lid opened.
Figure 9:
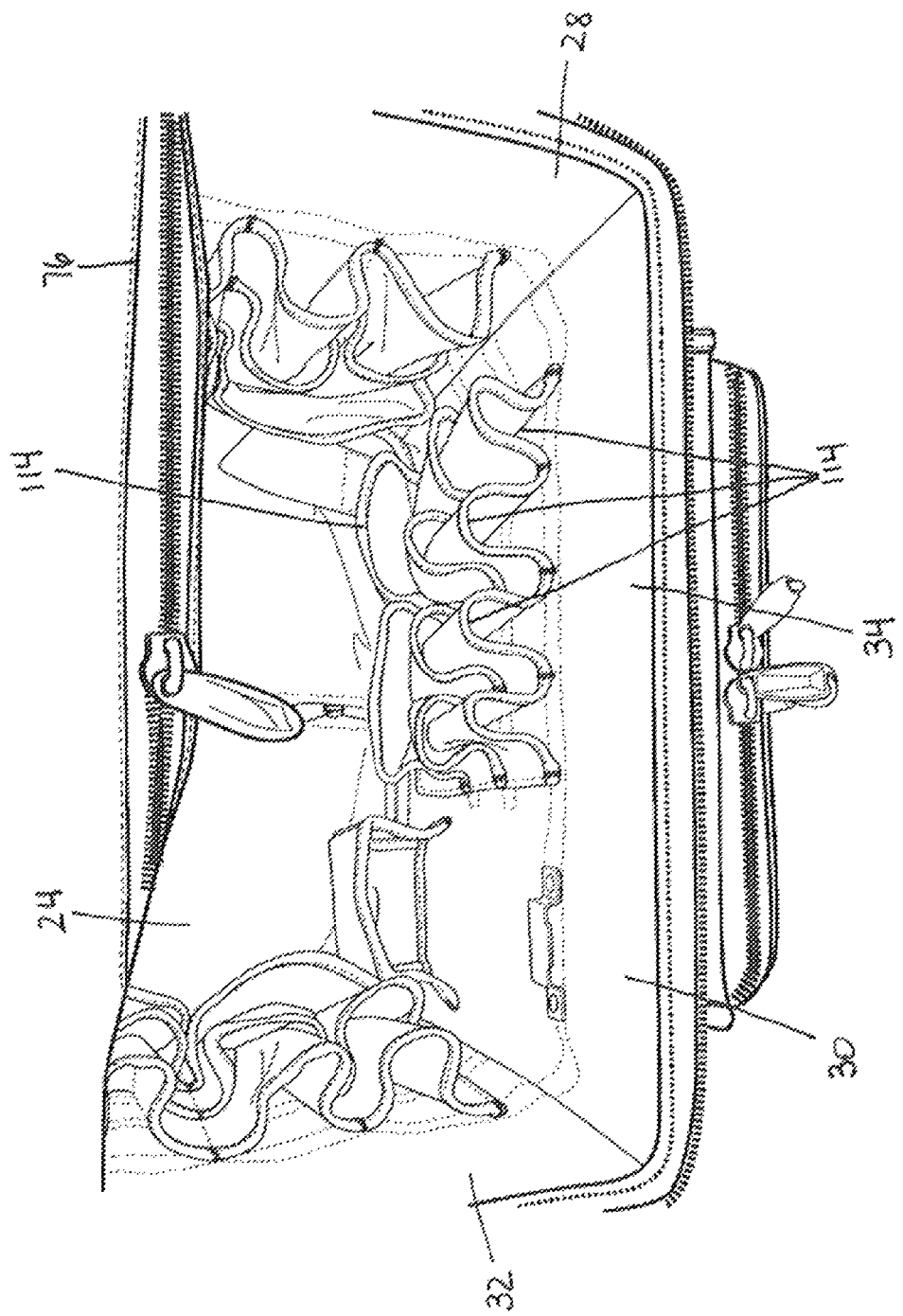
FIG. 9 is a top, perspective view of a rolling tool bag described herein showing the interior front wall.

As shown in the Figures, the tool bag 10 can include a plurality of closeable pockets 106 and open pockets 114 located inside and outside the tool bag body 12. For example, FIGS. 8 and 9 show a plurality of open pockets 114 attached to the interior facings 34. The open pockets 114 can be arranged in rows and can be arranged to include various tiers of open pocket 114 openings. In general, the open pockets 114 can be arranged in a fashion similar to that shown in U.S. patent application Ser. No. 12/607,842, filed Oct. 28, 2009, and entitled "Tool Bag with Secure-Pocket Configuration," the entirety of which is incorporated herein by reference. As a variation, the open pockets 114 can be arranged as described in the '842 Application, but without the elastic retention strips described therein.

Figure 5:
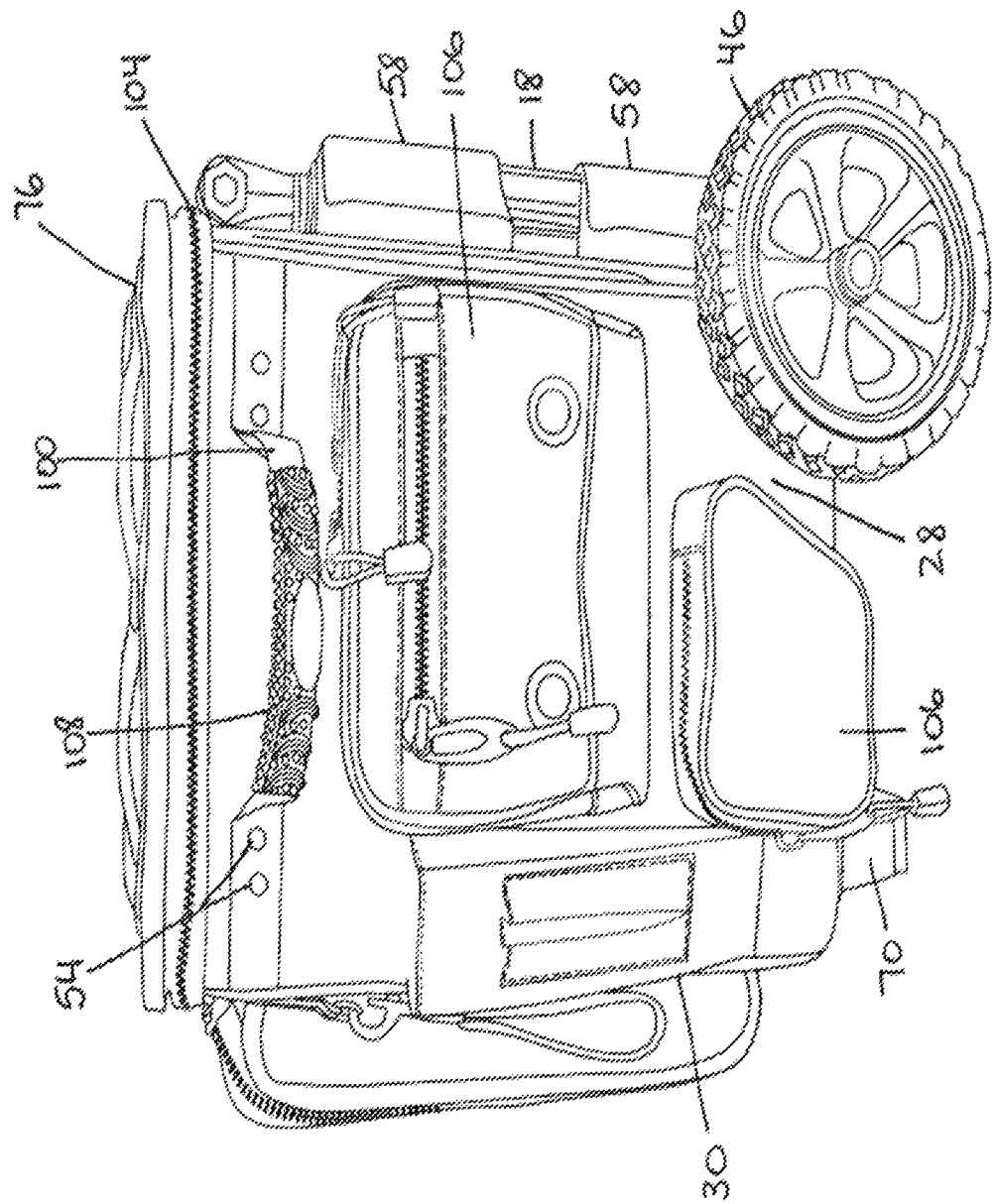
FIG. 5 is a right side view of a rolling tool bag described herein.
Figure 6:
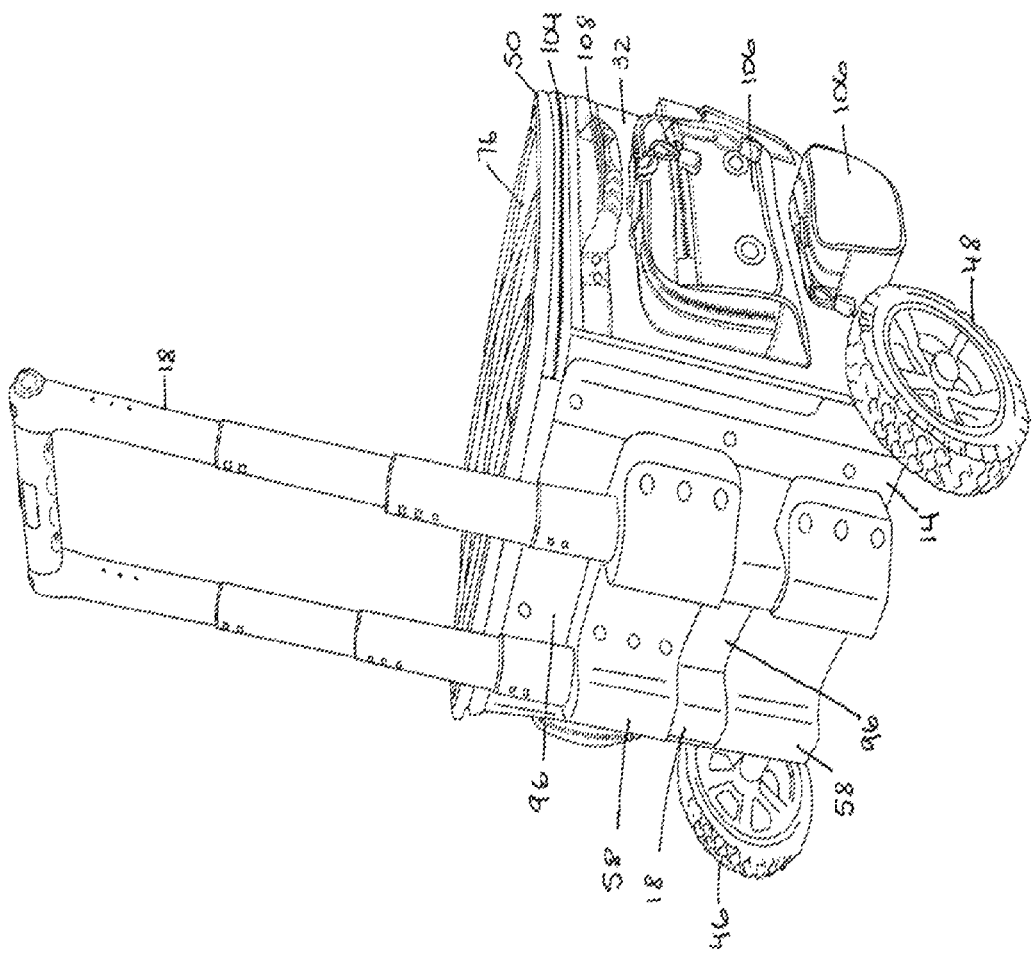
FIG. 6 is a back-left, perspective view of a rolling tool bag described herein.

FIGS. 1, 5 and 6 show tool bags with carrying handles 108 coupled to carrying straps 110 that are attached to the exterior of the tool bag body 12. The carrying handles 108 can be used to carry the tool bag 10, where it is impractical to roll the tool bag 10. For instance, the carrying handles 108 can be particularly useful when the tool bag 10 is transferred from the ground into a vehicle by lifting.

FIG. 8 shows an embodiment were the lid member 76 includes an open pocket 114. The open pocket 114 can have portable padding 112 secured therein. In some exemplary embodiments, the portable padding 112 can be used to protect the knees when it is necessary to kneel for an extended period of time.

Figure 11:
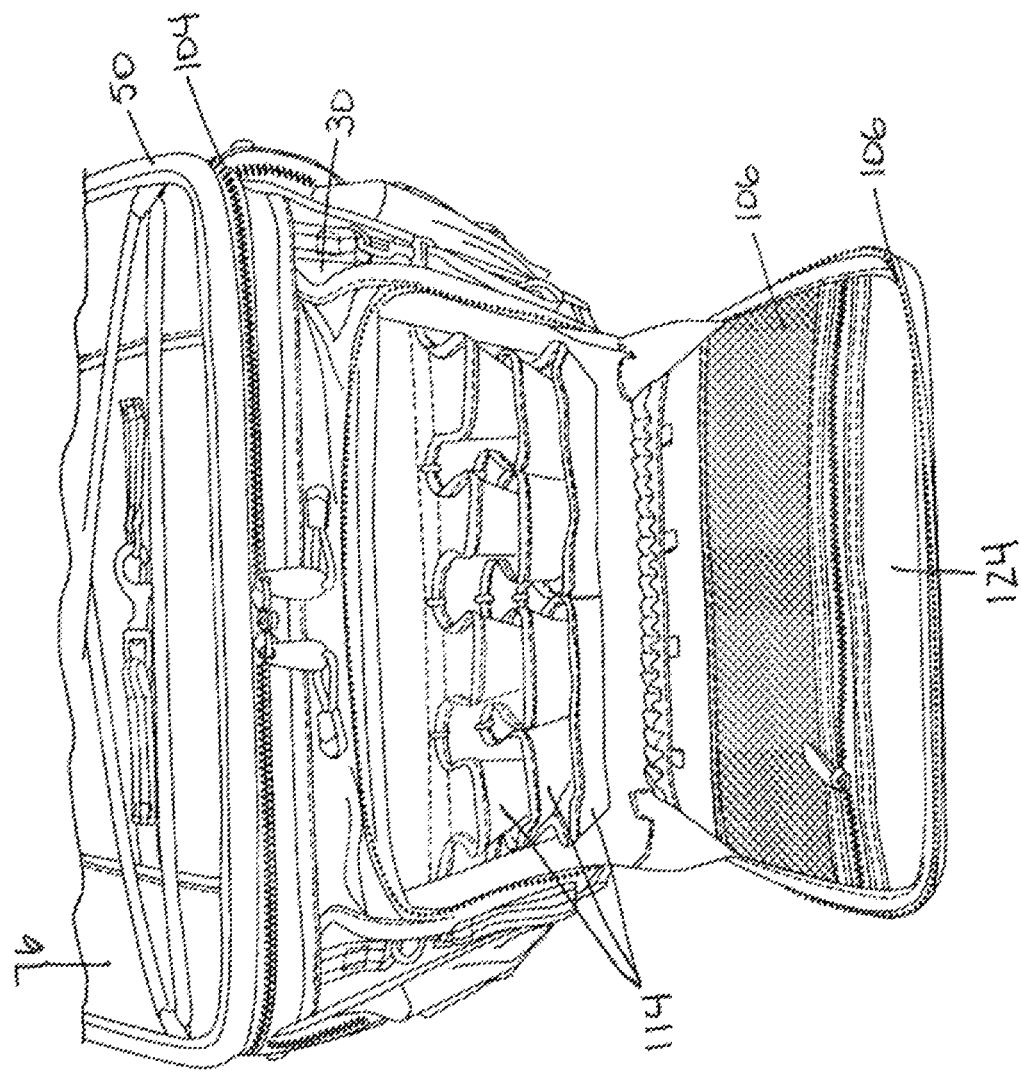
FIG. 11 is a perspective view of the front of the rolling tool bag described herein showing some storage features of an closeable pocket attached to the exterior of the front wall.

FIG. 11 shows an embodiment where a closeable pocket 106 attached to the exterior facing 38 covering the front wall 30 is in the open position. As shown, the external flap 124 is pivoted into an open position. Additional closeable pockets 106 and open pockets 114 are disposed within the large closeable pocket 106.

Figure 13:
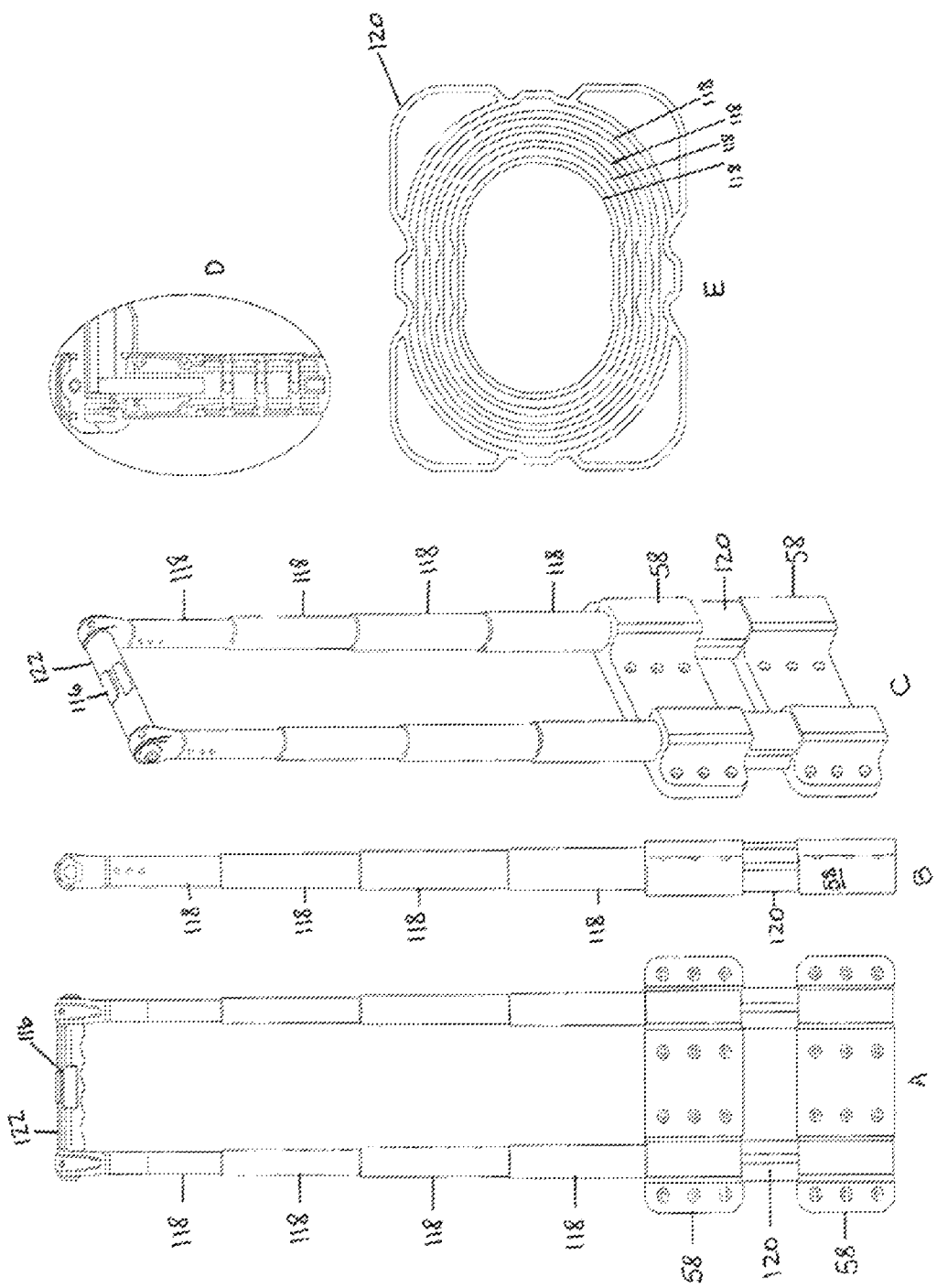
FIGS. 13A-E are a variety of views showing details of the handle and handle mounting features.

FIG. 13 shows a number of views of an exemplary telescoping handle 18, including two handle mountings 58, for use with the tool bags 10 described herein. The handle 18 can include a telescoping base 120 and a plurality of nested, telescoping elements 118 that can retract within the telescoping base 120

Figure 14:
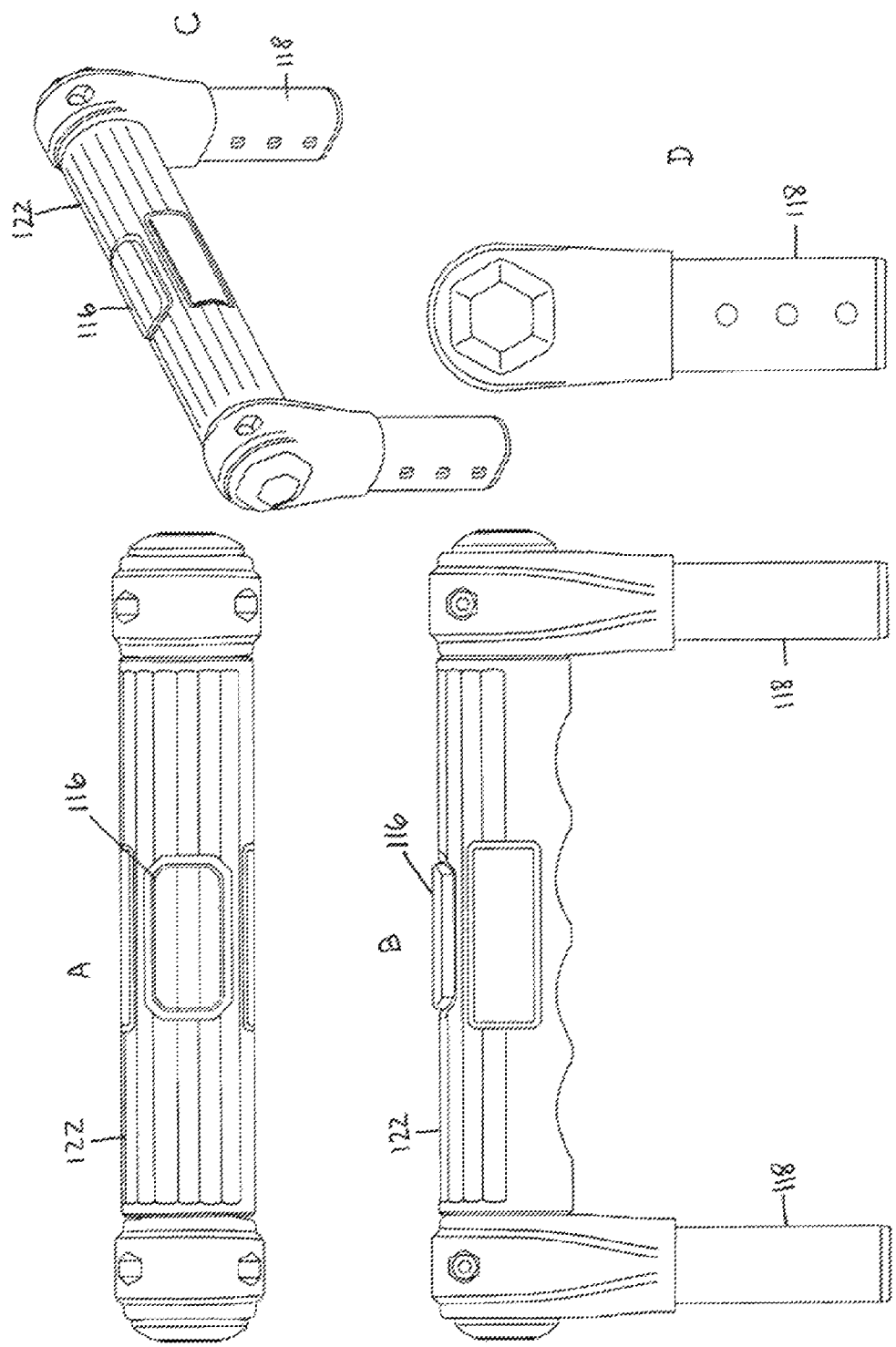
FIG. 14A-D are a variety of views showing details of the handle grip.

FIG. 14 shows a detailed view of the grip 122 attached to the telescoping handle 18. As shown, the grip 122 can include a telescoping actuator 116 for actuating the telescoping mechanism. An exemplary telescoping actuator 116 can be a button, such as that shown in FIG. 14.

EXAMPLES

The tool bags 10 described herein can exhibit exceptional durability even when equipment weighing 100 pounds or more is stored in the tool bag body 12. In one experiment, a tool bag, such as shown in FIGS. 1-15, was loaded with 100 pounds of weight and the telescoping handle fully extended. The tool bag was then lifted 6 inches by the grip and dropped repeatedly until failure. The tool bag was dropped more than 100 times prior to any failure. In contrast, a commercially available rolling tool bag was exposed to the same test conditions. The commercially available rolling tool bag failed after the first drop.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A tool bag, comprising:
a tool bag body comprising an open topped storage volume, said tool bag body, further comprising:
first and second body reinforcing members, comprising planar portions reinforcing a bottom wall, a back wall, a right side wall, a front wall, and a left side wall of said tool bag body,
interior facings covering an interior of said tool bag body, and
exterior facings covering an exterior of said tool bag body, wherein said interior and exterior facings are coupled to form first and second compartments and said first and second body reinforcing members are disposed within said first and second compartments, respectively;
an axle-handle stabilizing member attached to said tool bag body;
an axle coupled to said axle-handle stabilizing member;
first and second wheels attached to opposite ends of said axle, wherein said first and second wheels are located outside said right side wall and said left side wall, respectively;
a bottom wall stabilizing plate disposed internal to said body reinforcing members, wherein said axle-handle stabilizing member is attached to said bottom wall stabilizing plate;
a bottom wall stabilizing frame disposed internal to said body reinforcing members, wherein said bottom wall stabilizing frame is coupled to said bottom wall stabilizing plate, a back wall portion of said first body reinforcing member, and a bottom wall portion of said first body reinforcing member; and
a handle rigidly coupled to said axle-handle stabilizing member.

2. The tool bag according to claim 1, further comprising a support leg extending from an exterior, front portion of said bottom wall.

3. The tool bag according to claim 1, wherein said interior and exterior facings are coupled via a binding.

4. The tool bag according to claim 3, wherein said binding extends along the path defined by the adjacent edges of the first and second body reinforcing members.

5. The tool bag according to claim 1, wherein said first body reinforcing member reinforces both a bottom wall and back wall of said tool bag body, and said second body reinforcing member reinforces a right side wall, a front wall and a left side wall of said tool bag body.

6. The tool bag according to claim 1, wherein said first body reinforcing member is not attached to said second body reinforcing member.

7. The tool bag according to claim 1, further comprising a back wall stabilizing plate disposed internal to said body reinforcing members, wherein said axle-handle stabilizing member is disposed outside said tool bag body and is attached to said back wall stabilizing plate.

8. The tool bag according to claim 7, wherein said handle comprises a handle mounting portion, said handle mounting portion attached to said back wall stabilizing plate and said axle-handle stabilizing member.

9. The tool bag according to claim 1, wherein said bottom wall stabilizing plate is disposed between said first body reinforcing member and said bottom wall stabilizing frame.

10. The tool bag according to claim 1, wherein said bottom wall stabilizing frame comprises at least one longitudinally-oriented element and at least one laterally-oriented element coupled together, said laterally-oriented element extending substantially across a width of said bottom wall.

11. The tool bag according to claim 1, further comprising a lid member, pivotably coupled to said back wall, said lid member for closable attachment to an upper rim of said tool bag body.

12. The tool bag according to claim 11, wherein said lid member comprises a lid stabilizing plate.

13. The tool bag according to claim 1, further comprising a reinforcing rim element disposed proximate an upper rim of said tool bag body for maintaining a shape of said upper rim.

14. The tool bag according to claim 1, further comprising at least one side-stabilizing member coupled to each of a right side wall portion, a front wall portion and a left side wall portion of said first and/or second body reinforcing member.

15. The tool bag according to claim 14, wherein said at least one side-stabilizing member is arranged vertically and has an aspect ratio of 2:1 or greater.

16. The tool bag according to claim 1, wherein said tool bag body further comprises at least one corner-stabilizing member extending from a left side wall to a front wall of said second body reinforcing member, from a front wall to a right side wall of said second body reinforcing member, or both.

17. The tool bag according to claim 1, wherein said axle-handle stabilizing member comprises at least two parallel, longitudinally-oriented ridges extending along a bottom wall stabilizing portion and a back wall stabilizing portion of said axle-handle stabilizing member.

* * * * *